United States Patent
Jouan De Kervanoael

(10) Patent No.: US 8,191,947 B2
(45) Date of Patent: Jun. 5, 2012

(54) CLAMP FOR MANIPULATING ROBOT WITH ENHANCED GRIPPING ACCURACY AND MANIPULATING ROBOT COMPRISING AT LEAST ONE SUCH CLAMP

(75) Inventor: Tanguy Jouan De Kervanoael, Neauphle le Chateau (FR)

(73) Assignee: Commissariat a l'Energie Atomique, Paris (FR)

( * ) Notice: Subject to any disclaimer, the term of this patent is extended or adjusted under 35 U.S.C. 154(b) by 42 days.

(21) Appl. No.: 12/665,804

(22) PCT Filed: Jun. 23, 2008

(86) PCT No.: PCT/EP2008/057935
§ 371 (c)(1),
(2), (4) Date: Dec. 22, 2009

(87) PCT Pub. No.: WO2009/000795
PCT Pub. Date: Dec. 31, 2008

(65) Prior Publication Data
US 2010/0156127 A1     Jun. 24, 2010

(30) Foreign Application Priority Data
Jun. 25, 2007 (FR) .................................. 07 56006

(51) Int. Cl.
*B66C 1/00* (2006.01)
(52) U.S. Cl. ............. 294/106; 294/907; 901/34; 901/46
(58) Field of Classification Search .................. 294/106, 294/907, 28, 86.29, 97; 901/39, 46, 33, 34; 414/729; 72/290
See application file for complete search history.

(56) References Cited

U.S. PATENT DOCUMENTS

| | | | | |
|---|---|---|---|---|
| 4,351,553 A | * | 9/1982 | Rovetta et al. | 294/106 |
| 4,456,293 A | * | 6/1984 | Panissidi | 294/106 |
| 4,579,380 A | | 4/1986 | Zaremsky et al. | |
| 5,318,331 A | * | 6/1994 | Tozuka | 294/88 |
| 5,762,390 A | * | 6/1998 | Gosselin et al. | 294/106 |
| 5,871,248 A | | 2/1999 | Okogbaa et al. | |
| 7,445,260 B2 | * | 11/2008 | Nihei et al. | 294/106 |

(Continued)

FOREIGN PATENT DOCUMENTS
DE    19806231 C1    7/1997
(Continued)

OTHER PUBLICATIONS

Preliminary International Search Report for Appl. No. FR0756006 dated Nov. 20, 2007.

(Continued)

*Primary Examiner* — Saul Rodriguez
*Assistant Examiner* — Gabriela Puig
(74) *Attorney, Agent, or Firm* — Pearne & Gordon LLP

(57) ABSTRACT

This invention relates to a gripper for a manipulator robot comprising two members articulated at a first end, each member comprising a jaw support (8') at a second end, and a jaw (10') that will come into contact with an object, the jaw (10') being approximately plane, a force sensor (26') arranged between at least one jaw support (8') and a jaw (10') so as to apply a force during displacement of the jaw (10'), and a deformable parallelogram connection (14') connecting the jaw (10') to the jaw support (8'), the sensor (26') being oriented such that a sensitive axis of the sensor is orthogonal to the plane of the jaw (10').

17 Claims, 8 Drawing Sheets

U.S. PATENT DOCUMENTS

| | | | |
|---|---|---|---|
| 7,988,215 B2 * | 8/2011 | Seibold | 254/134.3 FT |
| 2007/0013199 A1 * | 1/2007 | Hall et al. | 294/106 |
| 2007/0018470 A1 * | 1/2007 | Hayakawa et al. | 294/106 |

FOREIGN PATENT DOCUMENTS

| | | | |
|---|---|---|---|
| DE | 19644502 A1 | | 5/1998 |
| EP | 0441060 A2 | | 8/1991 |
| EP | 441060 A2 | * | 8/1991 |
| EP | 0974421 A1 | | 1/2000 |
| JP | 61050030 A | | 3/1986 |
| JP | 01210285 A | * | 8/1989 |
| JP | 09070786 A | * | 3/1997 |
| JP | 10151595 A | | 6/1998 |

OTHER PUBLICATIONS

International Search Report for Appl. No. PCT/EP2008/057935 dated Sep. 10, 2008.

* cited by examiner

CLAMP FOR MANIPULATING ROBOT WITH ENHANCED GRIPPING ACCURACY AND MANIPULATING ROBOT COMPRISING AT LEAST ONE SUCH CLAMP

TECHNICAL FIELD AND PRIOR ART

This invention relates to a gripper for a manipulator robot with an improved gripping precision and a manipulator robot comprising at least one such gripper.

Manipulator robots are increasingly used in industry and in everyday life, particularly to assist the handicapped.

These manipulator robots comprise at least one gripper installed articulated at the end of an arm, itself articulated onto a chassis.

Most robot grippers are mechanical or electromechanical grippers without any force sensor. The force is controlled by a direct force feedback in the case of a mechanical remote manipulator, or by current control in motors to modify the tightening torque or using a potentiometer to measure a position offset of members of the gripper relative to a set value, due to an elastic deformation due to the gripping force.

Some grippers are equipped with contact detectors in order to detect the moment at which the gripper comes into contact with the object, and means of measuring the force to control the gripping force so that the gripped object will not be deformed.

Document EP 0974 421 discloses a gripper for an articulated robot arm comprising a contact detector formed by a pusher fitted free to translate in a jaw, the contact is detected by means of an electrical contact, however this sensor does not measure the intensity of the contact force, and consequently it is incapable of managing the gripping force. The jaw is mounted on a parallelogram that displaces the jaw in successive parallel planes, and the jaw plays no role in detection of contact and measurement of this force.

A gripper comprising cells full of compressible fluid is also known, and the measurement of the cells deformation provides the means of fixing the gripping force necessary for safe gripping of an object, and a shear force sensor type sensor is used. This gripper requires an additional contact sensor to determine when the gripper comes into contact with the object.

It is also known how to use a monoaxial compression sensor as a contact detector placed directly behind a sliding stud in one of the gripper jaws. The sensor is installed in the jaw such that the sensor axis is arranged approximately orthogonally relative to the jaw surface. However, it can only measure forces applied along a direction orthogonal to the compression zone of the sensor. Consequently, the measurement is only reliable in cases in which the force applied by the object to be gripped when the jaw comes into contact with it is coaxial with the sensor axis.

Admittedly, this sensor can tolerate a slight misalignment of the applied force, and the force is then resolved into a component along the sensor axis and along an axis orthogonal to this axis. If the misalignment is too severe, there is a large measurement error and a risk of damaging the sensor, which is not designed to resist radial forces of the orthogonal component.

FIGS. 1A and 1B show a gripper 102 in which the jaws 104 are mounted on the sensor 106, and this assembly is only suitable if the force F1 is orthogonal to the jaws 104 and passes through the X axis of the sensor 106. In all other cases, forces F2 and F3 applied to the jaws 106 generate a bending moment on the sensor which can be damaged.

It also exists a gripper 202, the jaws 204 of which are guided on the sensor 206 as shown in FIGS. 2A and 2B, that to prevent the sensor from resisting parasite forces or moments. The jaws comprise a guide 211 with an axis orthogonal to the surface of the jaw 204 and capable of sliding around the body of the sensor 206 on the face 208 opposite the face 209 that will come into contact with the object, such that the face 209 of the jaw 204 are displaced orthogonally to the X axis of the sensor 206.

This assembly effectively eliminates parasite forces on the sensitive part of the sensor, however the sensor only measures the component along the sensor axis, which is prejudicial to the precision and the sensitivity of the measurement. Furthermore, this guide generates parasite friction between the jaw and the sensor that reduces the measurement sensitivity.

Furthermore, if a force F3 is applied, this can cause jamming that prevents translation and operation of the sensor 206.

One solution to eliminate or at least reduce these forces would be to provide a ball slide type guide system between the body of the sensor and the jaw, but this assembly is complex and very large relative to the volume of a gripper.

FIGS. 3A and 3B show another type of gripper 302 according to the state of the art, in which each of the two jaws 304 is mounted free to pivot about an end 311 on the jaw support 312, the sensor 306 always been located between the jaw support 312 and the jaw 304.

Friction is very much reduced in this assembly, and furthermore a spring 314 is provided to compensate for any clearance in the articulation.

The sensitivity of the sensor is good, however it depends on the contact point of the object on the jaws, and also the radial component of the force is resisted by the articulation and not by the sensor, therefore the precision is low if forces are inclined relative to the sensor axis.

Document JP 01210285 discloses a gripper to grip objects, this gripper comprising two members each of which is fitted with a jaw and a jaw support, the jaw support being formed by spring blades inserted between the jaw and the member. Strain gauges are provided at the spring blades, and strain gauges are provided on the members themselves, these gauges being loaded in bending. The gauges can detect the value of the force necessary to hold the gripped object correctly. The sensitivity of the gripper depends on the contact point.

Consequently, the purpose of this invention is to make a gripper for a manipulator robot with good sensitivity for detection of contact with the object, high precision in measuring the contact force regardless of the direction of the force relative to the gripper jaws, and good detection and measurement repeatability.

Another purpose of this invention is to make a gripper for a manipulator robot equipped with a contact detection device and contact force measurement device that is easy to manufacture at a low cost price.

PRESENTATION OF THE INVENTION

The purposes mentioned above are achieved by using a gripper comprising two jaws and a jaw support for each of the jaws, at least one force sensor and a parallelogram type connection installed between a support and a jaw, the sensor being arranged between the jaw support and the jaw, the sensor having a compression axis coaxial with the gripping axis of the gripper.

Thus, there is no bending moment applied to the sensor that could damage it and friction is low, which makes the measurement precise. Furthermore, the position of the contact point between the jaw and the object in question has no influence on the value of the force measured.

In other words, means are provided capable of guiding the jaw to achieve a displacement of the jaw in successive parallel planes, thus preventing a bending moment from being applied on the sensor, while reducing friction and capable of making the force to be measured and the location at which it is applied on the jaw independent.

Therefore, the detection device according to this invention firstly detects the contact between the jaw and the object, and secondly measures the gripping force, this measurement being obtained by projecting the compression force onto the gripping direction of the gripper. This measurement is then independent of the direction of the compression force.

Use of a single sensor to detect the contact and also the contact force can simplify the gripper, reduce its dimensions inside the gripper and reduce the cost price of the gripper.

Fitting the jaw on a parallelogram can transfer the normal resultant of contact forces to the detector with an identical detection threshold and a constant sensitivity, in fact there is a linearity of the compression measurement and therefore the gripping ratio regardless of the contact point with the jaws, and regardless of the direction of the force.

In a first embodiment, the parallelogram is made using four connecting rods connected by transverse pins.

In a second particularly advantageous embodiment, the parallelogram is made in a single piece so that clearances at connections between the rods and friction can be eliminated.

The subject-matter of the present invention is then a gripper for a manipulator robot comprising two members articulated at a first end, each member comprising a jaw support and a jaw that will come into contact with an object at a second end, the jaw being approximately plane, a force sensor arranged between at least one jaw support and a jaw so that a force is applied to it when the jaw is displaced, and a deformable parallelogram connection connecting the jaw to the jaw support, the sensor being oriented such that a sensitive axis of the sensor is orthogonal to the plane of the jaw.

"Sensitive axis of the sensor" refers to the sensor detection and measurement axis in the case of a compression sensor, in other words the compression axis that is orthogonal to the compression surface.

In one particularly advantageous embodiment, the parallelogram is made in a single piece which can eliminate clearances and therefore improve the measurement precision.

The jaw support and/or a tray could also be made forming the base of the jaw in a single piece with the parallelogram, which simplifies manufacturing of the gripper.

The parallelogram may comprise parallel connecting rods articulated on the jaw support and the jaw.

The connecting rods are advantageously in the form of blades connected at their ends to the jaw support and to the jaw, the ends of the blades being thinned to enable articulation relative to the jaw support and the jaw.

Advantageously, the sensor is preloaded, which eliminates uncertainty about the sensor zero. In one example, the sensor is in contact with the parallelogram and preloading is obtained by means of a tight spring between a connecting rod of the parallelogram and the jaw support. In another example, the sensor is in direct contact with the jaw and the preload is obtained by means of a pressure screw mounted in the jaw facing the sensor.

It would be possible to insert a ball between the sensor and the jaw to eliminate lateral friction. This ball can be mounted in the jaw in contact with the pressure screw.

Advantageously, the ball is housed in a foam ring inserted between the ball and the jaw, to prevent the ball from getting jammed.

The sensor may be formed by a compact monoaxial compression sensor with strain gauges. A capacitive, magnetic or piezoelectric type sensor can also be used.

Advantageously, the gripper may comprise at least one camera and means of detecting the presence of the object between the jaws, for example formed by a light emitting diode fixed in a jaw and a receiving light emitting diode fixed in the other jaw facing the first diode. This gripper can then be used for high quality gripping.

The two jaws may be fitted on parallelogram connections, in this case the detection and the force measurement are even further improved.

Another purpose of this invention is a manipulator robot comprising at least one gripper according to this invention.

BRIEF DESCRIPTION OF THE DRAWINGS

This invention will be better understood after reading the following description and the appended drawings in which.

DETAILED PRESENTATION OF PARTICULAR EMBODIMENTS

Figure 1A:
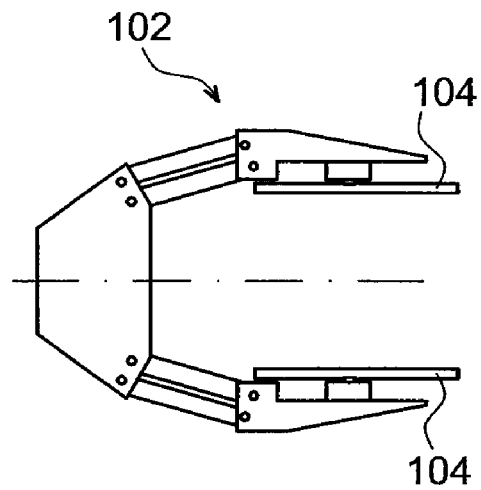
FIGS. 1A to 3B are side views of examples of grippers according to the state of the art.
Figure 1B:
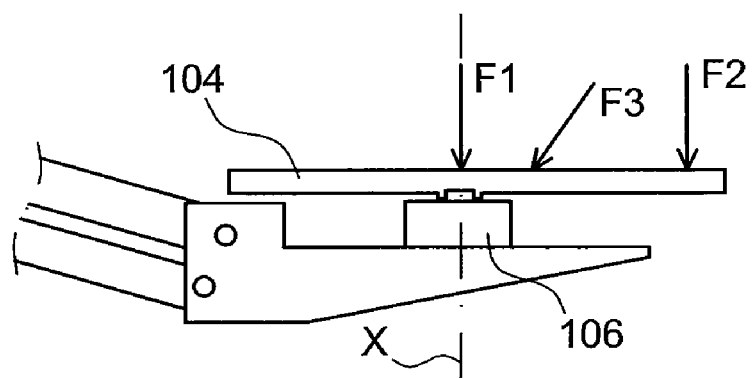
Figure 2A:
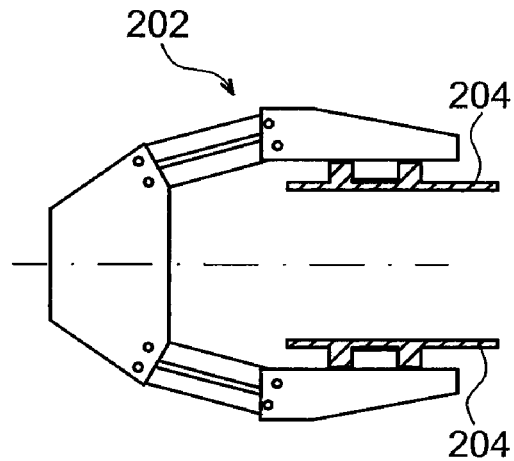
Figure 2B:
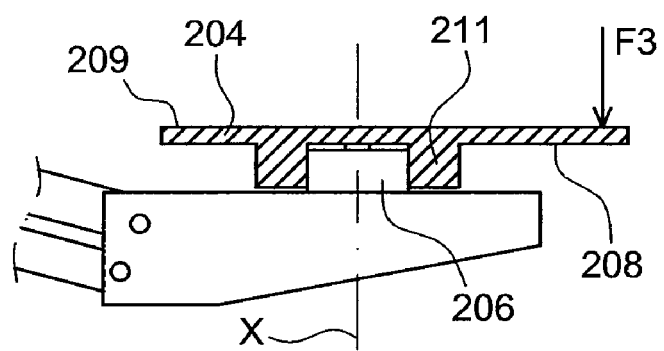
Figure 3A:
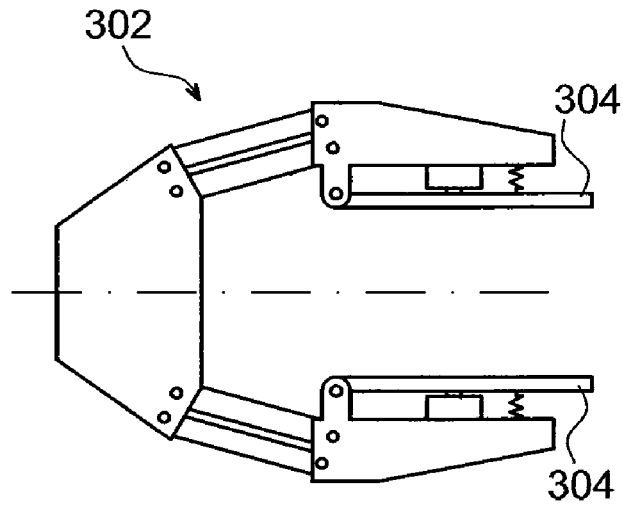
Figure 3B:
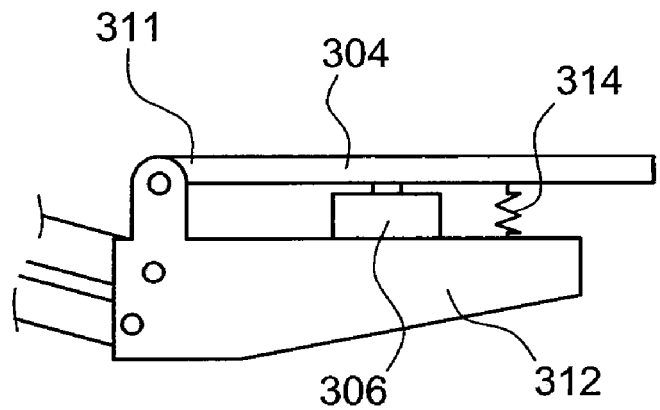
Figure 4:
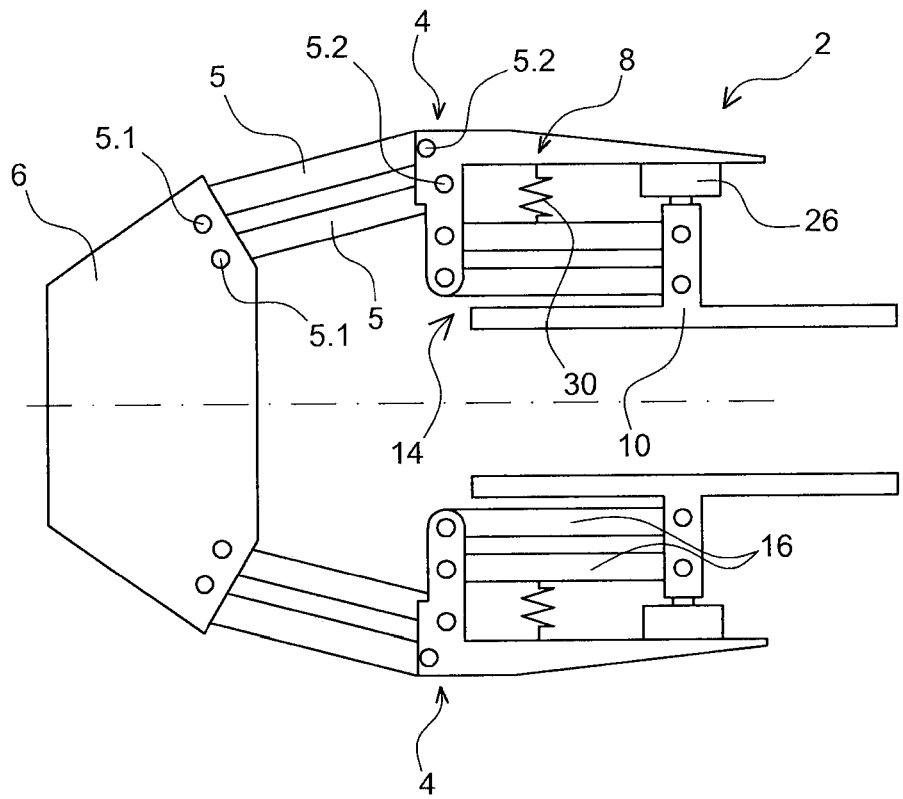
FIG. 4 is a side view of a first embodiment of a gripper according to this invention.

FIGS. 4 to 9 show a first embodiment of a gripper 2 according to this invention comprising two members 4 articulated on a support 6 through a first end forming an angle in its rest state and capable of being moved towards each other.

Since construction of the two members is similar, we will describe details of only one member 4.

In the example shown, the member 4 comprises two connecting rods 5 articulated on a support 6 through a first longitudinal end 5.1 and on a jaw support 8 carrying a jaw 10 through a second end 5.2.

The connecting rod formed by the jaw support 8 between the two ends 5.2 of the rods 5 is then displaced in the successive planes parallel to the rod connecting the two ends 5.1 of the rods 5. Thus, a displacement can be obtained by orienting the jaws appropriately relative to the jaw support 8, and particularly the two jaws 10 can be moved towards or away from each other in parallel planes.

Rigid members simply articulated on the support 6 could also be used.

According to this invention, the jaw 10 is articulated on the jaw support 8 by means of a parallelogram 14.

The parallelogram 14 comprises two pairs of parallel connecting rods 16, but only one pair is visible. Each of the connecting rods is connected in rotation through a first longitudinal end 16.1 to a frame 18 of the jaw support 8 and through a second longitudinal end 16.2 opposite the first end 16.1 to an frame 20 of the jaw 10, the frames 18 and 20 being parallel to form the parallelogram 14.

For simplification reasons, in the remainder of this description we will refer to this connection as a parallelogram, however the two pairs of connecting rods 16 and frames 18, 20 actually define an arbitrary parallelepiped.

In the example shown, the jaw support 8 is in the shape of a bracket delimited by the frame 18 and a base 22 orthogonal to the frame 18, and the side view of the jaw looks like a T, with the frame 18 forming the bottom of the T and a tray 24 forming the top of the T, the tray 24 being designed to come into contact with an object to be gripped (not shown).

In this description, no distinction is made between the part in contact with the sensor and the part that will come into contact with the object, this assembly being denoted by "jaw".

The member 4 also comprises a force sensor 26 placed between the base 22 and the free end 10.1 of the bottom of the jaw 10. More generally, the sensor 26 is inserted between the jaw and the jaw support 8 such that the contact force between the jaw and the object is applied to it.

Advantageously, the sensor is a monoaxial strain gauge compression sensor, the sensor is mounted in the jaw support 8 such that its axis is approximately orthogonal to the tray 24.

The sensitivity and resolution of this sensor are high. Its size is also small, therefore it is particularly suitable for installation inside a gripper. Obviously, any other type of sensor adapted to measuring a force could be used, for example a capacitive, magnetic or piezoelectric type sensor.

For example, the measurement range of the compression sensor may vary from 0N to 100N. This sensor is very small with a diameter of 5 mm and a height of 2.5 mm, which is ideal for installation inside the restricted volume of the gripper.

The sensor may comprise a separate processing module that may for example be fitted on the jaw support or on the member.

Its stiffness is $6.8 \times 10^8$ N/m.

The force is related to the displacement by the following relation:

$$F = K \times x, \text{ hence } x = F/K.$$

Thus, for a force F=100N applied to the sensor, $x = 1.6 \times 10^{-7}$ m, namely 0.16 μm.

Therefore the displacement is very small.

The rods 16 are connected to the uprights 18 and 20 through pins 28 orthogonal to the plane of the drawing.

An elastic means 30 is advantageously provided to apply a preload on the sensor 26 so as to eliminate the uncertainty around the sensor zero. This preload may for example be of the order of 1N in the case of the previously described sensor.

The elastic means 30 is installed in tension between the parallelogram 14 and the jaw support 8, more particularly between a rod 16 and the base 22. This elastic means also retains the parallelogram on the jaw support 8.

In the example shown, the elastic means 30 is a helical spring.

Advantageously, the spring 30 applies a slight preload on the compression sensor 26. Thus, this preload, eliminates the measurement uncertainty of the sensor around zero.

Insertion of a parallelogram shaped connection can achieve the same sensitivity regardless of the contact point on the tray of the jaw.

Figure 5:
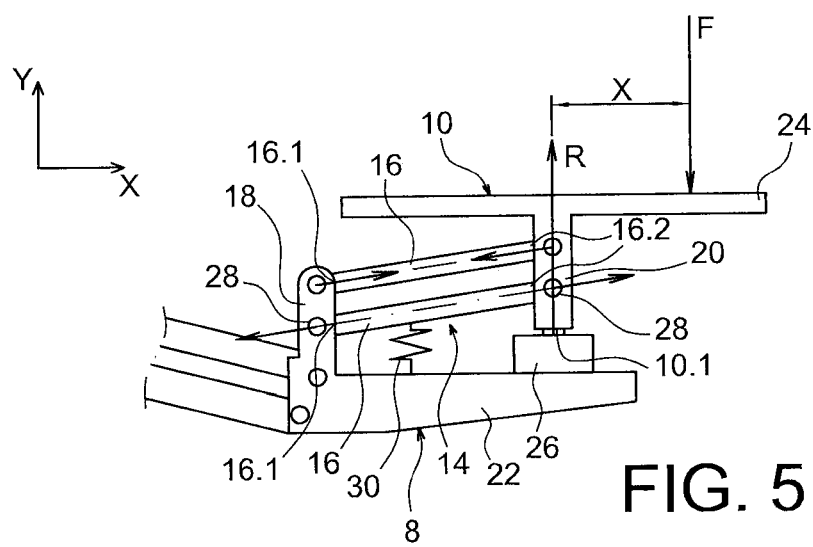
FIG. 5 is a detailed view of FIG. 4 on which the forces applied to the jaw are shown.
Figure 6:
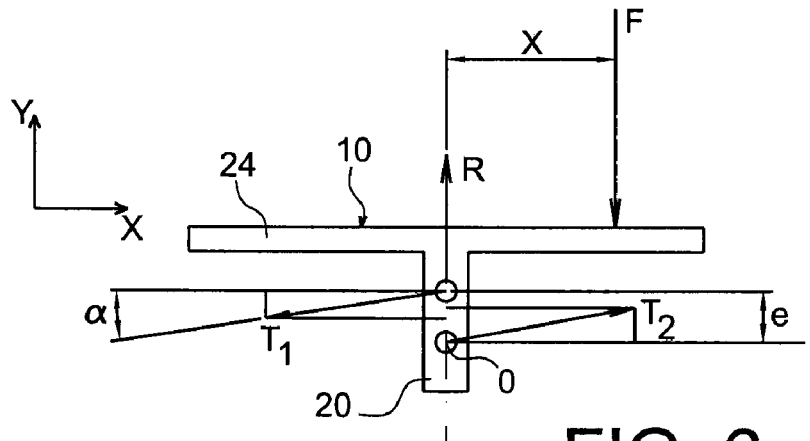
FIG. 6 is an enlarged view of FIG. 5.
Figure 7:
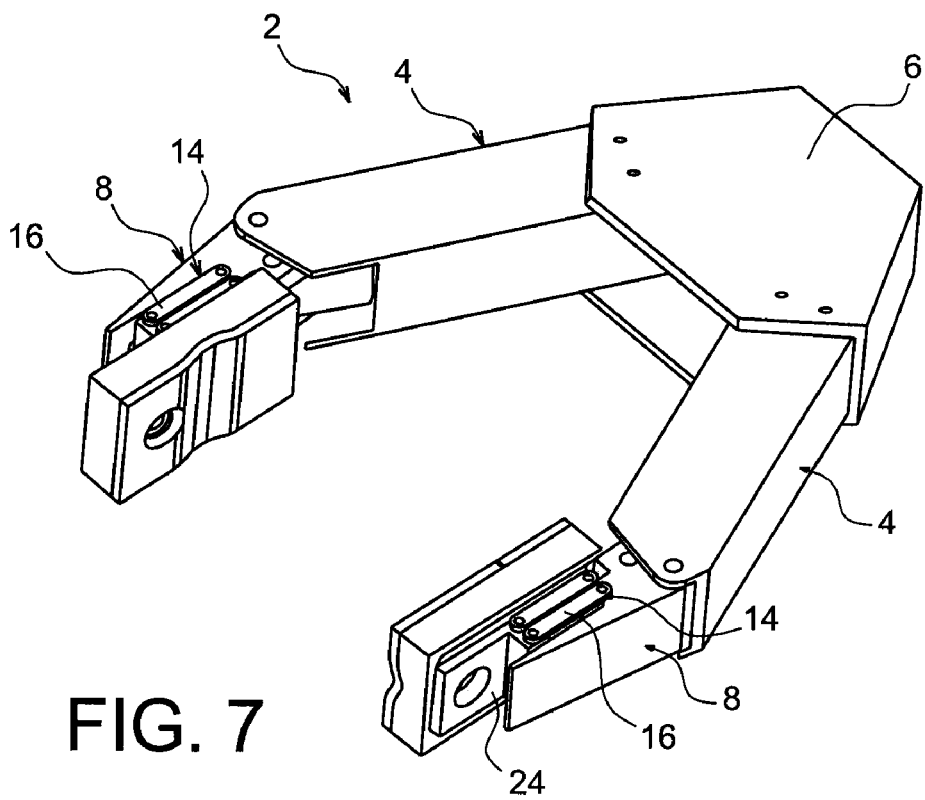
FIG. 7 is a perspective view of the gripper in FIG. 4.
Figure 8:
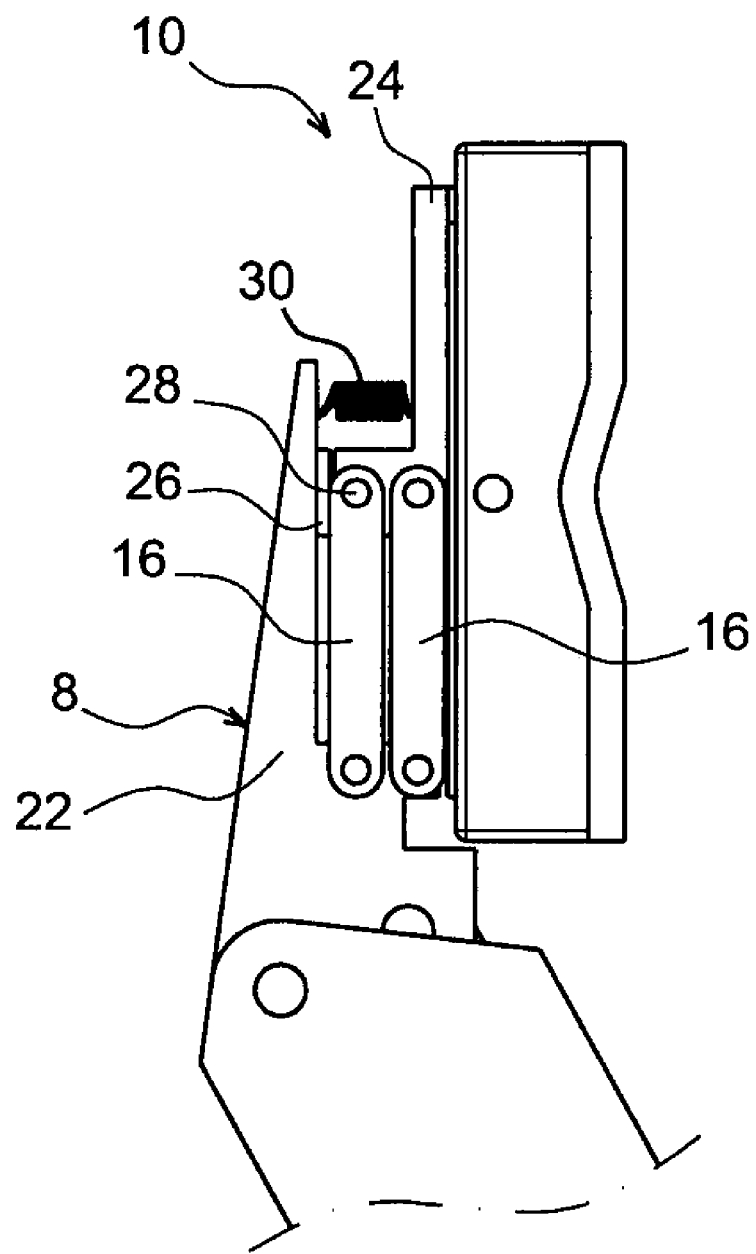
FIG. 8 is a side view of a detail of FIG. 7 at a jaw.

FIGS. 5 and 6 show a single member provided with a jaw 10 mounted on a parallelogram connection 14, the forces applied to the jaw 10 being shown.

The force denoted F is the contact force with the object to be gripped.

The force denoted R is the reaction measured by the compression sensor 26.

The forces denoted T1 and T2 are forces applied within the connection.

x is the abscissa of the point at which the force F is applied on the tray 24 in the XY coordinate system, the origin of which is denoted O located on the bottom of the jaw.

α is the angle formed between the tray and the rods 16.

e is the distance separating the two ends 16.2 of the rods 16.

According to this invention, the value of R is equal to the value of F, independently of the contact point.

The equilibrium equations can be written in the XY coordinate system:

$$T2 \cdot \cos \alpha - T1 \cdot \cos \alpha = 0 \tag{I}$$

$$R - F + T2 \cdot \sin \alpha - T1 \cdot \sin \alpha = 0 \tag{II}$$

$$F \times x - T1 \cdot \sin \alpha \times e = 0 \tag{III}$$

We can use equation (I) to deduce that T1 is equal to T2 and equation (II) to deduce that R is equal to F, regardless of the value of x.

According to this invention, the required deformation for the parallelogram is low, all that is necessary is that its maximum deformation should correspond to the maximum deformation of the sensor 26, for example between 0.02 μm and 0.2 μm.

In the example shown, each member 4 comprises a jaw mounted on a parallelogram connection, however it would be possible to provide a gripper with a single jaw articulated on a parallelogram, the other jaw being rigidly mounted on the jaw support.

For example, the gripper is actuated by a system of cables, pulleys, belts and an electric motor of a known type to those skilled in the art, therefore this system will not be described in detail.

This first mode is satisfactory, however in the case of large clearances at points at which connecting rods are articulated with each other, and particularly at the pins, the equality between the contact force F and the reaction R is no longer precise, regardless of the position of the contact point.

It will be possible to reduce these clearances, by precisely adjusting the pins in the connecting rods, however such adjustments can generate dry friction torques, which correspondingly reduce the sensitivity of the contact sensor 26.

It will then be possible to use preloaded ball bearings to eliminate clearances and friction.

According to a second embodiment shown in FIGS. 9 to 12, a parallelogram connection is provided in which the clearances and friction mentioned above have been eliminated, making the contact measurement even more sensitive and more reliable.

According to this second embodiment, a single piece parallelogram connection 14' capable of deforming is made, thus there are no clearances at the connections between rods.

In this second embodiment, the clearances and friction are replaced by a stiffness for which the law F=Kx or M=cθ is known, where K is the stiffness of the parallelogram in N/m and c is the angular stiffness expressed in mN/rd.

Figure 10:
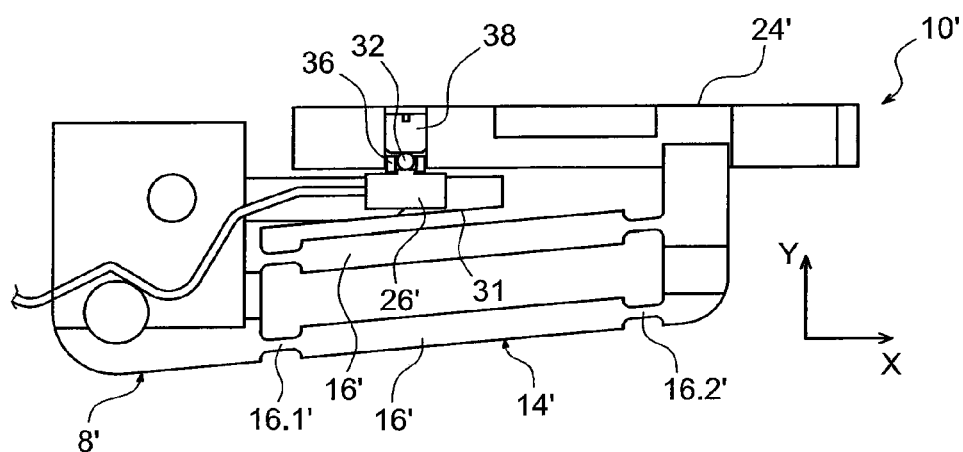
FIG. 10 is a detailed view of FIG. 9 at a jaw.

This is particularly clear in FIG. 10, the contact sensor 26' that is advantageously of the single axis type is mounted in the jaw support such that its axis is approximately orthogonal to the tray 24'. In the example shown, the jaw support 8' comprises a plate 31 projecting from the jaw support 8' parallel to the tray 24'.

The sensor 26' resists a pressure force applied directly by the tray 24'.

In the example shown, the jaw support 8' is made in a single piece with the parallelogram connection 14', the tray 24' is added onto the parallelogram connection 14'.

The parallelogram 14' and the jaw support may for example be made of stainless steel, aluminium alloy or any other metallic material. It would even be possible to make them from a synthetic material, for example plastic, because the required deformation is small.

A metal part can be made by machining a metal block.

A plastic part can be made directly by casting, which will result in a low cost price in the case of a large series production.

The choice of the material depends on the load that the gripper is designed to carry.

The sensor may be arranged between the mobile parts that stay in their original direction, and the frame.

It would also be possible to use the reduction in the preload as an indicator of a contact (or collision) outside the jaws.

It would be possible to envisage making a single-piece part with the same configuration as the first embodiment, the sensor 26 then being arranged in the same way.

Similarly, it would be possible to make the gripper according to the first embodiment, reusing the configuration of the second embodiment.

It would also be possible to make the tray, the jaw support and the connection in a single piece, or to make only the parallelogram connection in a single piece and to fix it to the jaw support and to the tray, for example by welding, gluing or using a screw-nut system.

This advantageous single-piece embodiment is particularly appropriate because as we have already said, the required deformation is very small, for example of the order of 0.02 μm to 0.2 μm along the Y axis.

The single-piece parallelogram 14' comprises two blade-shaped connecting rods 16', the ends 16.1', 16.2' of which connected to the other two parallel connecting rods are thinned to make the pivot connections and to enable deformation of the parallelogram.

The blade-shaped connecting rods 16' are advantageous because they provide good torsional stiffness of the jaw and good bending flexibility at the thinned ends.

It would also be possible to provide circular or square bar-shaped connecting rods, adapting their section to the torsion force to be resisted.

Figure 9:
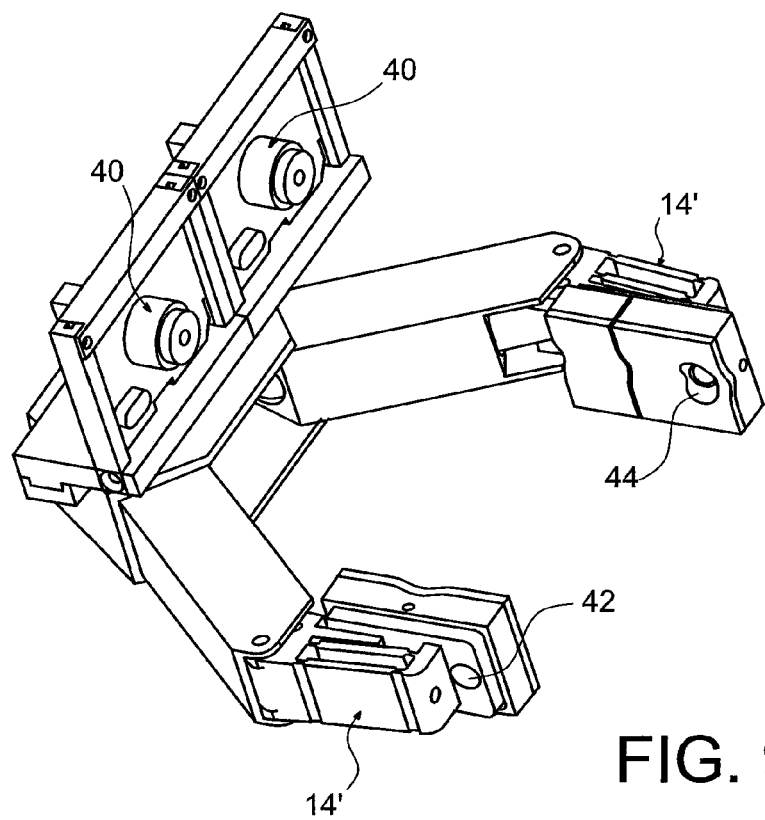
FIG. 9 is a perspective view of a gripper according to a second embodiment of this invention.

Furthermore, as can be seen particularly in FIG. 9, large blades are provided, and in this case a single blade replaces two parallel rods.

Figure 11:
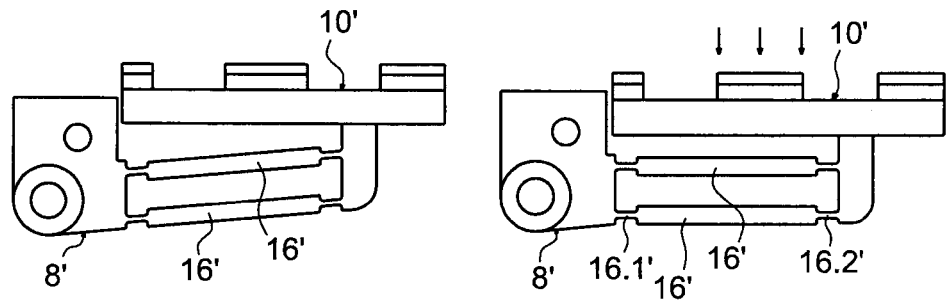
FIG. 11 shows an assembly according to this invention in an at-rest state and in a deformed state.
Figure 12:
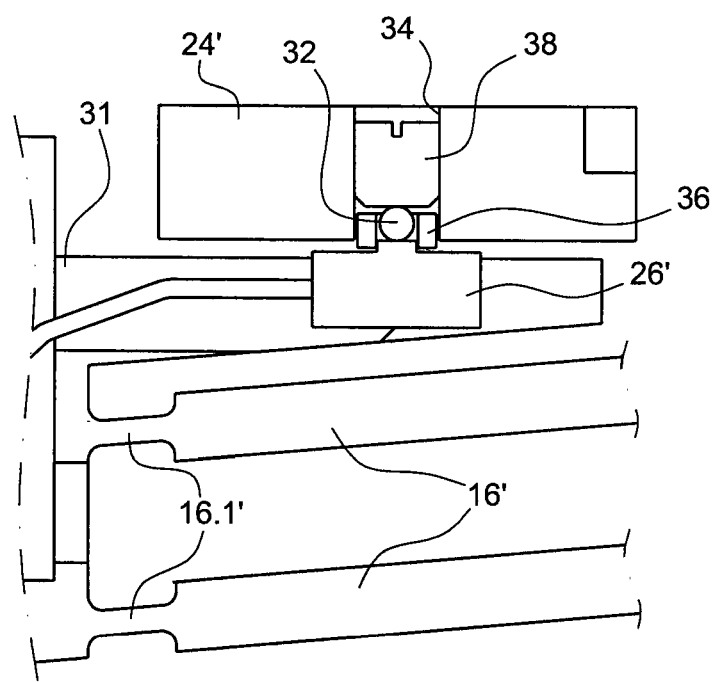
FIG. 12 is a detailed view of FIG. 10.

FIG. 11 shows the end of the gripper comprising the jaw, the parallelogram connection 14' and the jaw support in a deformed state corresponding to coming into contact with the object to be gripped, the tray remains in a parallel position relative to its rest position.

Friction between the tray and the contact sensor is made by displacing the tray along the X axis, however this friction does not reduce the measurement sensitivity because its direction is orthogonal to the direction of the contact force to be measured that is oriented along the Y axis.

However, a ball 32 could advantageously be provided to prevent any risk of occurrence of parasite friction between the contact sensor and the tray. Friction is then eliminated due to rolling of the ball. In the example shown, the ball is installed in a bore 34 of the tray along the Y axis.

Means 36 could be provided to prevent the ball from getting jammed if it comes into contact with the edge of the bore, these means 36 can be formed by an elastic foam washer inserted between the periphery of the ball and the surface of the bore, thus the ball 32 does not bear on the surface of the bore 34 and therefore cannot get jammed along the X axis.

The ball and the ring can also be provided in the first embodiment.

As in the first embodiment, it is advantageously planned to apply a slight preload to the compression sensor to eliminate the measurement uncertainty at zero. The order of magnitude of the preload for a sensor with a measurement range of 100N, is between 1N and 10N.

This slight preload is obtained naturally by the elasticity of the parallelogram by adjusting the position of the tray relative to the parallelogram.

A pressure screw 38 screwed into the tray on the gripping side of the jaw is provided to apply the preload, the pressure screw 38 is screwed more or less into the bore 34 to increase or reduce the preload of the compression sensor. This is particularly attractive in the case of an assembly composed of a jaw support, jaw and a single-piece parallelogram assembly.

Note that the value of the preload is taken into account to measure the force and is deducted from the measured value.

Like the first embodiment, the second embodiment was described with two jaws mounted on a deformable parallelogram, which enables optimum gripping of the object and its gripping, but obviously only a single jaw can be installed on such a parallelogram.

This invention has the advantage that it enables the use of standard compression sensor.

Furthermore, regardless of the position and direction of the contact force, the force is always applied along the axis of the sensor, therefore there is no risk of the sensor being damaged by application of the transverse force.

Only the normal component of the applied force is measured by the sensor, rather than the total force brought into the sensor axis. This is the normal gripping force of the gripper between the object and the jaw. Tangential forces are resisted by tension and compression of the rods. The force sensor does not measure any force if the only force applied is parallel to the jaw.

Furthermore, as we have already mentioned, the detection and measurement of the force are independent of the contact point.

Furthermore, the measurement uncertainty around zero may advantageously be eliminated by the preload applied at the contact sensor.

The second embodiment also has a high resolution that is equal to the resolution of the compression sensor and therefore high sensitivity because the clearances and almost all friction are deleted.

Furthermore, its manufacturing is very easy because it requires few parts. It is even possible to make the jaw, the jaw support and the parallelogram in a single piece.

The gripper gripping force can also be controlled with this sensor.

The gripper thus made, and particularly the assembly of the jaws, do not require any expensive components, and its sensitivity and resolution are high. It is also robust and very compact, therefore it only very slightly reduces the opening of the gripper, in other words the space between the two members of the gripper and can be used with very small grippers.

Furthermore, in the example given, the gripper is fitted with two cameras 40, for example CCD type cameras installed above the gripper to display the object to be gripped and to measure the distance separating it from the gripper by means of stereoscopy. An optical barrier is also provided comprising a light emitting diode 42 and a receiving light emitting diode 44 facing the diode 42, each installed in a jaw 10' of the gripper, this barrier being useful to detect an object when it arrives between the two jaws 10', the object then interrupting the optical beam between the two diodes 42, 44.

We will now explain operation of the gripper according to this invention.

When it is required to grip an object with the gripper according to this invention, the object is displayed by cameras 40 used to displace the gripper, and then when the object is between the two jaws 10', the beam between the two diodes 42, 44 is cutoff and the presence of the object is detected.

The gripper is actuated so as to bring the jaws 10' closer to the object.

The sensor 26' detects when one of the jaws 10' comes into contact with the object. If only one of the jaws 10' comes into contact with the object, the jaws 10' are displaced so as to put the object into a median position relative to the jaws 10', in fact at the time at which the object will be gripped, it is preferable that the two jaws 10' are at an equal distance from the edges of the object to prevent the object from being displaced while gripping. The contact detection that follows is then practically simultaneous in each jaw.

Then when the two jaws 10' are in contact with the object, the gripper grips the object and the gripping control using the same sensor 26' makes it possible to avoid damaging the gripped object and then to put it down more delicately, gradually releasing the grip.

The invention claimed is:

1. Gripper for a manipulator robot including two members articulated at a first end, each member including:
    a jaw support at a second end and a jaw that will come into contact with an object, said jaws being approximately plane,
    a force sensor arranged between at least one of said jaw supports and an associated jaw so as to apply a force during displacement of said jaw, the sensor being oriented such that a sensitive axis of the sensor is orthogonal to the plane of said jaw, the force sensor being fixed with respect to the jaw support and separate from said associated jaw, and
    a deformable parallelogram connection connecting said jaw to said jaw support, such that the displacement of the jaw with respect to the jaw support deforms the parallelogram connection and applies force to the jaw while maintaining said jaws in parallel planes during movement towards or away from each other.

2. Gripper according to claim 1, in which the parallelogram is a single piece.

3. Gripper according to claim 2, in which the jaw support and/or a tray forming base of the jaw are made in a single piece with the parallelogram.

4. Gripper according to claim 1, in which the parallelogram comprises parallel connecting rods articulated on the jaw support and the jaw.

5. Gripper according to claim 4, in which the parallelogram is a single piece and in which the connecting rods are in the form of blades connected at their ends to the jaw support and to the jaw, the ends of the blades being thinned to enable articulation relative to the jaw support and the jaw.

6. Gripper according to claim 4, in which the jaw support and/or a tray forming base of the jaw are made in a single piece with the parallelogram and in which the connecting rods are in the form of blades connected at their ends to the jaw support and to the jaw, the ends of the blades being thinned to enable articulation relative to the jaw support and the jaw.

7. Gripper according to claim 1, in which the sensor is preloaded.

8. Gripper according to claim 7, in which the sensor is in contact with the parallelogram and the preload is obtained by means of a tight spring between a connecting rod of the parallelogram and the jaw support.

9. Gripper according to claim 1, in which the sensor is a monoaxial compression sensor with strain gauges.

10. Gripper according to claim 1, in which the sensor is of the capacitive, magnetic or piezoelectric type.

11. Gripper according to claim 1, including at least one camera and a detector of the presence of the object between the jaws, for example formed by a light emitting diode fixed in a jaw and a receiving light emitting diode fixed in the other jaw facing the first diode.

12. Gripper according to claim 1, in which the two jaws are fitted on parallelogram connections.

13. Gripper for a manipulator robot including two members articulated at a first end, each member including:
    a jaw support at a second end and a jaw that will come into contact with an object, said jaws being approximately plane,
    a force sensor arranged between at least one of said jaw supports and an associated jaw so as to apply a force during displacement of said jaw, the sensor being oriented such that a sensitive axis of the sensor is orthogonal to the plane of said jaw, wherein the sensor is preloaded and is in direct contact with the jaw and the preload is obtained by means of a pressure screw mounted in the jaw facing the sensor, and
    a deformable parallelogram connection connecting said jaw to said jaw support.

14. Gripper for a manipulator robot including two members articulated at a first end, each member including:
    a jaw support at a second end and a jaw that will come into contact with an object, said jaws being approximately plane,
    a force sensor arranged between at least one of said jaw supports and an associated jaw so as to apply a force during displacement of said jaw, the sensor being oriented such that a sensitive axis of the sensor is orthogonal to the plane of said jaw,
    a deformable parallelogram connection connecting said jaw to said jaw support, and
    a ball inserted between the sensor and the jaw.

15. Gripper according to claim 14, in which the sensor is in direct contact with the jaw and the preload is obtained by means of a pressure screw mounted in the jaw facing the sensor and in which the ball is mounted in the jaw in contact with the pressure screw.

16. Gripper according to claim 14, in which the ball is housed in a foam ring inserted between the ball and the jaw.

17. Manipulator robot comprising at least one gripper including two members articulated at a first end, each member including:
    a jaw support at a second end and a jaw that will come into contact with an object, said jaws being approximately plane,
    a force sensor arranged between at least one of said jaw supports and an associated jaw so as to apply a force during displacement of said jaw, the sensor being oriented such that a sensitive axis of the sensor is orthogonal to the plane of said jaw, the force sensor being fixed with respect to the jaw support and separate from said associated jaw, and
    a deformable parallelogram connection connecting said jaw to said jaw support, such that the displacement of the jaw with respect to the jaw support deforms the parallelogram connection and applies force to the jaw while maintaining said jaws in parallel planes during movement towards or away from each other.

* * * * *